E. A. JOHNSTON AND C. W. MOTT.
POWER CULTIVATOR.
APPLICATION FILED OCT. 25, 1916.
1,422,985.
Patented July 18, 1922.
3 SHEETS—SHEET 3.
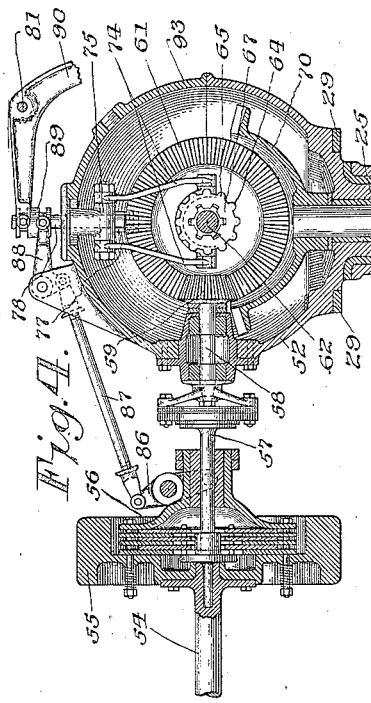
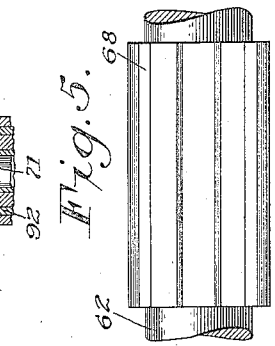
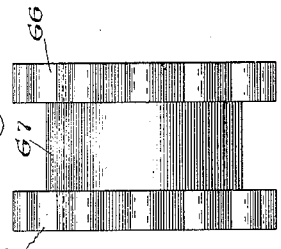
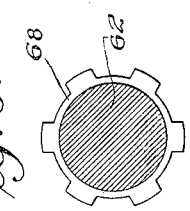
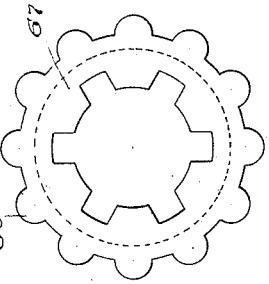
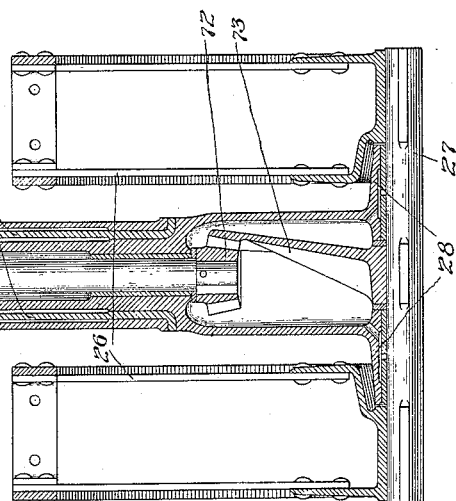
Inventors:
Edward A. Johnston
And Carl W. Mott.
By Chas. E. Lord
Atty.

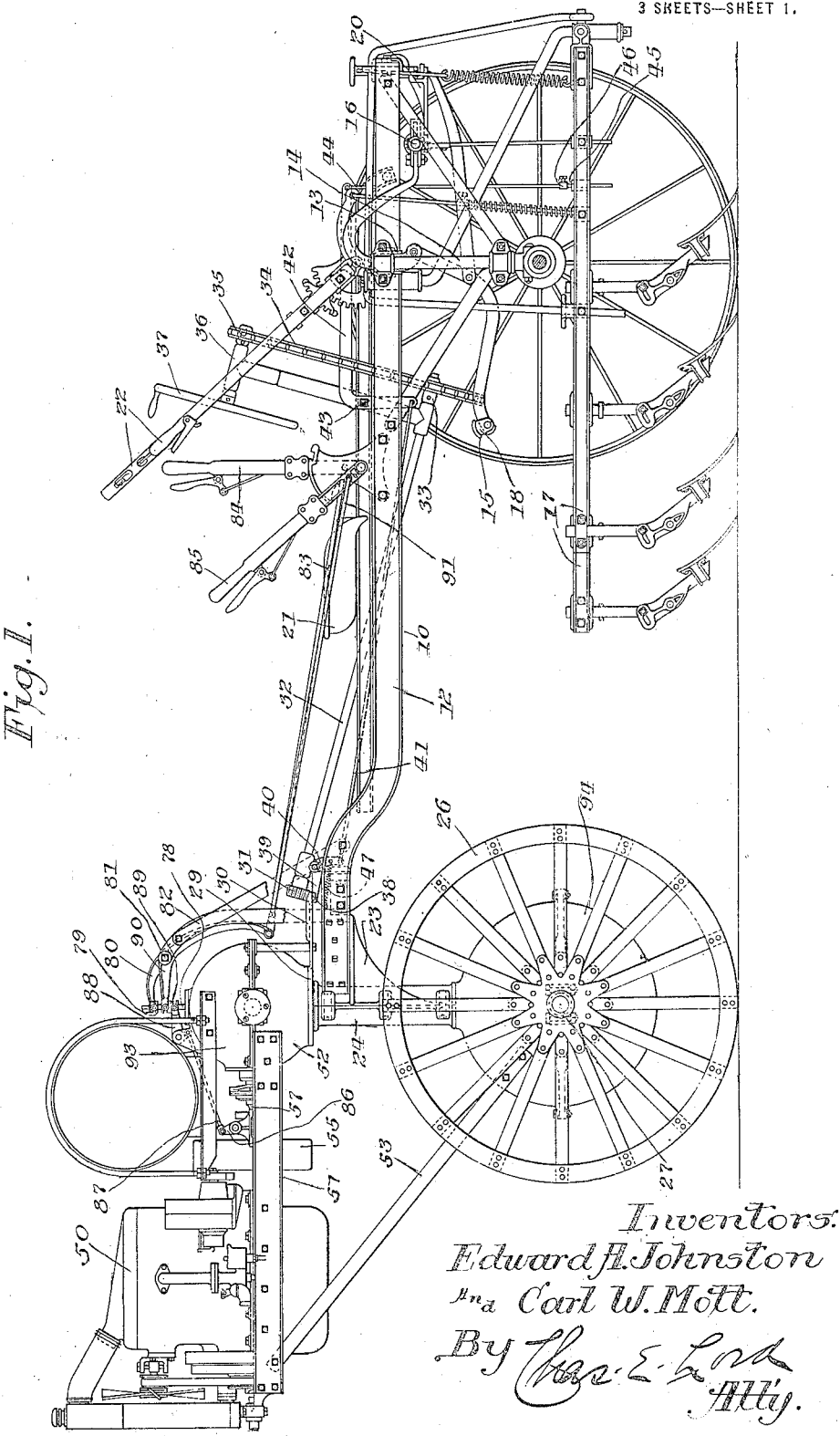

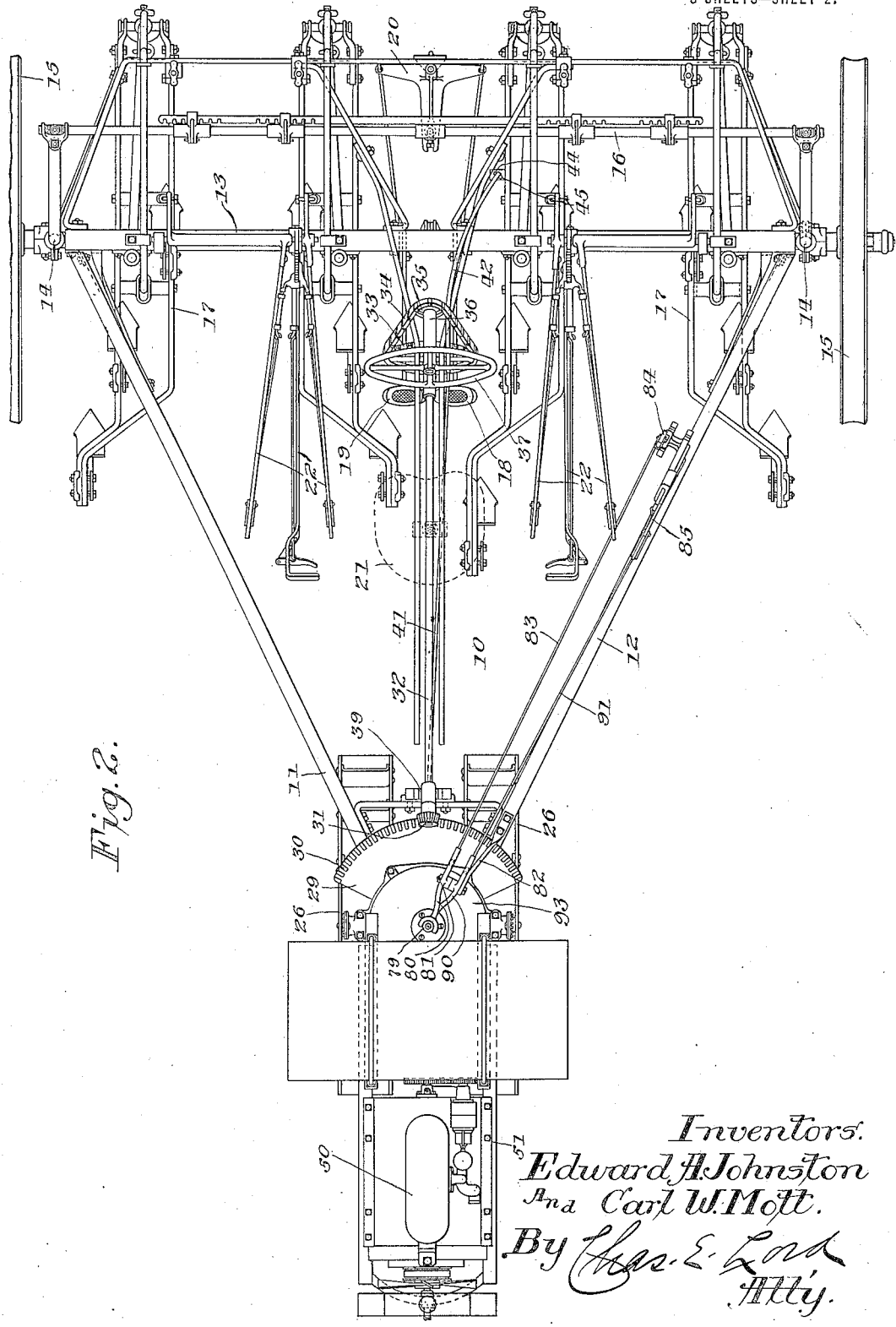

UNITED STATES PATENT OFFICE.

EDWARD A. JOHNSTON, OF CHICAGO, AND CARL W. MOTT, OF BERWYN, ILLINOIS, ASSIGNORS, BY MESNE ASSIGNMENTS, TO INTERNATIONAL HARVESTER COMPANY, A CORPORATION OF NEW JERSEY.

POWER CULTIVATOR.

1,422,985.     Specification of Letters Patent.     Patented July 18, 1922.

Application filed October 25, 1916. Serial No. 127,619.

*To all whom it may concern:*

Be it known that we, EDWARD A. JOHNSTON and CARL W. MOTT, citizens of the United States, and residents, respectively, of Chicago, in the county of Cook and State of Illinois, and of Berwyn, in the county of Cook and State of Illinois, have invented certain new and useful Improvements in Power Cultivators, of which the following is a full, clear, and exact specification.

This invention relates to power cultivators.

One of the objects is to accomplish efficient cultivation by the use of a power operated cultivator.

Another object is to provide a self-contained power operated cultivator.

Another object is to control the various parts in a simple and novel manner and to controllably connect various operative elements in a manner to insure proper action in a given order.

And another object is to provide a power cultivator adapted to meet all the requirements for successful commercial operation.

These and other objects are accomplished by providing a power cultivator having a ground treating tool, means for propelling the same, and means for controlling the movements of said tool.

The invention is illustrated on the accompanying sheets of drawings, in which—

Figure 1 is a side elevation of our power cultivator;

Figure 2 is a plan view of the same;

Figure 3 is a fragmentary vertical sectional view of the propelling wheels and their forward and reverse power connections;

Figure 4 is a sectional view showing part of the transmission shown in Figure 3 but in a different plane, and also a section of the clutch connecting the crank shaft with the transmission gearing;

Figure 5 is a fragmentary front elevation of the cross shaft of the transmission gearing, showing a fluted portion upon which the clutch may be slidably mounted;

Figure 6 is a cross sectional view of the same;

Figure 7 is a side elevation of the clutch which is slidably mounted upon the cross shaft shown in Figure 5; and Figure 8 is an end view thereof.

The various novel features of the invention will be clearly indicated by the following description and drawings and will be particularly pointed out in the appended claims.

For economical and other practical reasons, it is desirous, at least to a certain degree, to make farm implements power operated. In this particular instance attention has been directed to providing power cultivators. Many problems are presented in developing a unit of this nature; for instance, the proper steering of the machine and control of the shovels or cultivating members, controlling the engine which is employed to propel the cultivating members, and at the same time keep the construction simple, durable and generally satisfactory. In this case an attempt has been made to provide a power unit, all parts of which may be controlled in a simple and efficient manner to produce the best results.

This power cultivator includes a frame 10 having forwardly diverging members 11 and 12 connected to the main cross frame member 13 of the cultivator proper. Pivotally connected to the cross frame member 13 by means of vertical spindle members 14 are carrying cultivator wheels 15, which are connected by a cross bar 16 for simultaneous angling to direct the course of movement of cultivating gangs 17 and their ground treating tools as the same pass between rows of plants. It will not be necessary to go into detail and describe the particular arrangement of the cultivating members and their connections to the frame, etc., for these may be standard. It is to be noted, however, that the cultivator wheels 15 are angled by means of foot control members or pedals 18 and 19, which are connected to the cross bar 16 through connections including a suitably supported pivotally mounted T-shaped member 20, the stem of which cooperates directly with the cross bar 16. From an inspection of the drawings, it will be seen that if the right-hand pedal 18 is depressed, the carrying cultivator wheels 15 will be turned toward the right, and if the foot control pedal 19 is depressed and the pressure removed from the other pedal 18, the cultivator wheels 15 will be turned to the left, as viewed in Figure 2. In this manner the cultivator members may be properly guided between the rows of plants. A suitably supported operator's seat 21 is provided within convenient reach of the foot control pedals 18 and 19. Also other cultivator control levers 22 for controlling the raising and lowering of the gangs individually and collectively are provided within convenient reach of the operator's seat.

The rear ends of the cultivator frame members 11 and 12 are connected to a casting 23 which, with its mating casting 24, forms a bearing column for the vertically arranged steering shaft 25 of the steering and propelling wheels 26, which are keyed to the ends of a cross shaft 27 journaled in a longitudinally extending bearing portion 28 of the vertical steering shaft 25. Secured to the upper portion of this vertical steering shaft 25 is a sector plate 29 provided on its upper circular rim with a rack 30 which cooperates with a gear 31 mounted upon one end of a suitably supported shaft 32, the other end of which is provided with a sprocket wheel 33, around which passes a chain 34, which also passes around a sprocket wheel 35 mounted upon one end of a steering shaft 36 having a hand control wheel 37 adjacent the operator's seat 21. By means of this arrangement, therefore, it is possible to angle the propelling and steering wheels 26 through the hand control wheel 37.

In this connection attention is called to the fact that during normal operating conditions, that is, when the cultivating tools are being propelled between rows of plants, the traction wheels 26 are locked in their central position, which corresponds to a straight line movement. The locking means includes a pair of spaced projections 38, between which a latch 39 is normally positioned. It is seen, therefore, that when the cultivating tools are propelled between the rows of plants, the cultivator is steered entirely by angling the front cultivator wheels 15 through the agency of the foot control pedals 18 and 19, the traction or propelling wheels 26 merely following in a natural manner without having any steering effect whatsoever. The steering of the cultivator through the angling of the cultivator wheels 15 is for dodging purposes mainly, that is, dodging of plants. However, when the end of a row is reached, in order to turn directly to pass down the adjacent side of the last row of plants cultivated, a greater steering movement must be given to the frame than can be accomplished by merely angling the front cultivator wheels 15. Therefore, when the end of the field or end of a row is reached, the propelling wheels 26 are angled through the operation of the hand control wheel 37. The front cultivator wheels 15 may be angled at the same time or not, as desired. However, in order to angle the propelling wheels 26, it is necessary first that the locking latch 39 be removed from between the lugs 38 on the under side of the sector plate 29. It is well understood, of course, that when the end of the row is reached, the cultivating tools or shovels are raised out of the ground to facilitate the turning of the cultivator. We have taken advantage of this fact in connection with the control of the locking means for the propelling wheels, that is to say, we have provided a control connection between the cultivator beams, or one of them, and the propelling wheels 26 such that when a cultivator beam is raised out of and above the ground, the latch 39 will be automatically withdrawn from between the lugs 38 on the sector plate 29, whereupon the propelling wheels 26 may be angled through the operation of the hand control wheel 37. Conversely, when the cultivating tools are lowered and the propelling wheels are in their central position, the latch 39 automatically moves into normal position between the lugs 38 to lock the propelling wheel 26 in said normal position. This control connection includes the latch 39, forming one portion of a suitably supported bell crank lever 40, a rod 41 connected to this bell crank lever and also to another bell crank lever 42 pivotally mounted at 43, a rod 44, the upper end of which is connected to the front end of the bell crank lever 42, and the lower end of which passes through a suitable opening in a laterally projecting member 45 secured to one of the cultivator beams. Adjustably secured to the lower end of the rod 44, above the projection 45, is a member 46 which, when the cultivator beams are raised, is engaged by the projection 45 to withdraw the latch 39 from its locking position. When the cultivator beams are lowered, the latch 39 is snapped back into its locking position through the action of a spring 47, or it may be moved back into its locking position by proper distribution of the weight in the various members of the connection. It is seen, therefore, that when the cultivating tools are raised the propelling wheels 26 are automatically unlocked so that they may be freely angled for turning the cultivator, and that when the cultivating tools are lowered, the propelling wheels 26 are automatically locked in their normal central position.

The propelling wheels 26 receive their power from an engine 50 which is mounted upon a frame structure 51 connected to an enlarged or substantially spherical portion 52 of the vertical steering shaft 25, the frame 51 being braced by suitable connections 53 between the rear end of the frame 51 and an annular portion at the base of the steering shaft 25.

Mounted upon one end of the crank shaft 54 (see Figure 4) is a fly wheel 55 including one portion of a friction clutch 56, the other portion of which is operatively connected to a shaft 57 which in turn is connected to a shaft 58 journaled in the spherical portion 52 of the steering shaft 25 and having at its free end a pinion 59. This pinion meshes with two oppositely arranged bevel gears 60 and 61 (see Figure 3) which are loosely mounted upon a cross shaft 62 journaled in lateral bearings 63 formed in the spherical portion 52 of the steering shaft 25. The bevel gear 60 is provided with a clutch member 63, and the gear 61 is provided with a clutch member 64, which are adapted to be engaged, respectively, by cooperating clutch members 65 and 66 formed on a sliding member 67 splined to the central portion 68 of the shaft 62. Keyed to the shaft 62, near one end thereof, is a bevel gear 69 which meshes with a larger bevel gear 70 keyed to the upper end of a shaft 71 journaled in the steering shaft 25 and having at its lower end a bevel gear 72 meshing with a larger bevel gear 73 keyed to the central portion of the cross shaft 27 upon which the propelling wheels 26 are mounted. It is seen, therefore, that if the engine is operating, and assuming that the pinion 59 is rotating in a counterclockwise direction, as indicated in Figure 3, if the clutch member 65 is shifted into engagement with the clutch member 63, motion will be transmitted from the engine through the forward gear 60 and connecting parts to drive the propelling wheels 26 in a direction for forward movement of the cultivator. On the other hand, if the clutch member 66 is shifted into engagement with the clutch member 64, power from the engine will be transmitted through the reverse gear 61 and connecting parts to drive the propelling wheels 26 for backing the cultivator. As shown in Figure 3, the clutch or sliding member 67 is in its neutral position so that neither a forward nor reverse movement will be transmitted to the propelling wheels 26. The clutch member 67 is shifted in one direction or the other through a pair of arms (see Figures 3 and 4) 74 pivotally mounted to a casting 75, the arms 74 having a laterally extending portion 76 to complete a bell crank. Pivotally connected to the outer end of the portion 76 is an arm 77 mounted on the lower end of a rod 78 which passes up through the casting 75 and which is provided with two collars 79, between which one end of a lever 80 is located. This lever is pivoted at 81 to a suitable support 82, and the lower end of the lever is connected to a rod 83, the other end of which rod is connected to a control lever 84 adjacent the operator's seat 21. If the operator desires to have the cultivator driven in a forward direction, he throws the control lever 84 forwardly, whereupon the clutch 67 will be shifted in such a manner that its member 65 will engage with the clutch member 63 of the forward driving gear 60. On the other hand, the implement may be given a reverse movement by throwing the control lever 84 in a reverse direction, whereupon the sliding clutch member 67 will be shifted so that its member 66 will engage with the clutch 64 of the reverse gear 61.

The clutch 56 between the engine and the transmission parts just described is controlled by another lever 85 which also is located adjacent the operator's seat 21, the levers 84 and 85 being connected to the right-hand frame member 12 and having the usual cooperating segments and locking detents.

The connection between the clutch 56 and control lever 85 includes a lever 86, link 87, and bell crank lever 88, one end of which operates in a collar 89 slidably mounted upon the stem 78, the collar also being connected to one end of a pivotally mounted lever 90, the other end of which is connected to a rod 91, which in turn is connected to the clutch control lever 85.

What we have referred to as the steering shaft 25, it will be noted, has three parts, the main portion being indicated by reference character 25, which is journaled in a sleeve 92 in the mating castings 23 and 24 of the main frame. The upper portion of the steering shaft is the enlarged spherical portion 52, which has a removable cap 93. The lower end of the steering shaft 25 is provided with a removable cap 94. In view of the fact that the engine carrying frame 51 and its bracing means 53 are connected directly to portions of this steering shaft 25, it is apparent that whenever the propelling wheels 26 are angled the engine frame 51, and necessarily the engine 50, also are angled in like manner; in other words, it may be said that the cultivator frame and the engine frame are pivotally connected about a vertical pivot for turning purposes.

By means of this power unit hereinabove described, it is seen that we have provided means for steering the unit as the same is cultivating between rows of plants, additional means for turning the cultivator, for instance, when the end of the row is reached, a control connection between the turning means and the cultivating tools, such that the propelling wheels will be locked in a certain position when the cultivating tools are in the ground and automatically unlocked when the cultivating tools are withdrawn from the ground, and again automatically locked when the cultivating tools are lowered, forward and reverse control means, and all other necessary control means for proper manipulation of the cultivating tools. It may be said that the cultivator proper, or the ground treating tools thereof, is pushed instead of pulled.

It is evident that there may be various modifications of the arrangement herein particularly shown and described, and it is our intention to cover all such modifications which do not involve a departure from the spirit and scope of our invention as set forth in the following claims.

What we claim as new is:

1. In a device of the class described, the combination of a main frame, carrying means and traction means supporting the respective ends thereof, a power plant on the frame for propelling the traction means, an implement adjustably supported on the frame, means for vertically adjusting the implement, means for angling the carrying means, positive steering means for the traction means, means for locking the traction steering means against operation, and means controlled by the position of the implement for releasing the locking means.

2. In a power propelled implement, the combination of a main frame, an implement frame pivotally mounted thereon, means for raising and lowering the implement frame, carrying means and traction means supporting the respective ends of the main frame, an engine mounted on the main frame, driving connections between the engine and traction means, steering means operatively connecting the implement frame and carrying means for laterally shifting the implement frame and normally steering the implement, means for steering the traction means in cooperation with the first mentioned steering means to effect a quick turning movement of the implement, and means controlled by the position of the implement frame preventing operation of the traction steering means when the implement is lowered.

3. In a power propelled implement, the combination of a frame, carrying means supporting the front end of the frame, traction means supporting the rear end of the frame, an earth working tool supported on the frame adjacent the front carrying means, an operator's seat supported on the frame in the rear of the carrying means and in front of the traction means, means for angling the front carrying means to normally steer the implement, means for positively steering the traction means, means for raising and lowering the tool, and means controlled by the vertical position of the tool for preventing operation of the traction steering means when the tool is lowered.

4. In a motor propelled implement, the combination of a frame, traction means supporting the rear end of the frame, means mounted on the frame for driving the traction means, carrying means supporting the front end of the frame, a plurality of cultivator gangs carried by the frame and movable both horizontally and vertically, means for angling the carrying means to steer the implement, operative connections between the angling means and gangs whereby the latter are shifting horizontally when the angling means is operated, steering means for the traction means, means for raising and lowering the gangs, and means for locking the traction steering means against operation when the gangs are lowered and for releasing the traction steering means when the gangs are raised.

5. In a power propelled implement, the combination of a main frame, carrying means and traction means supporting the respective ends thereof, an engine on the frame, driving connections between the engine and traction means, an earth working tool mounted on the main frame and movable both horizontally and vertically, means for angling the carrying means to steer the implement, means connecting the angling means and tool whereby the tool is shifted laterally when the carrying means is angled, steering means for the traction means, means for operating the traction steering means, means for raising and lowering the tool, and control means for the traction steering means connected with the tool whereby the traction steering means becomes inoperable when the tool is lowered and operable when the tool is raised.

In testimony whereof we affix our signatures.

EDWARD A. JOHNSTON.
CARL W. MOTT.